Patented July 15, 1941

2,249,111

UNITED STATES PATENT OFFICE 2,249,111

AROMATIC ALIPHATIC ETHER CHLORIDES AND PROCESS

Herman A. Bruson, Philadelphia, Pa., assignor to Röhm & Haas Company, Philadelphia, Pa.

No Drawing. Application March 29, 1938, Serial No. 198,697

10 Claims. (Cl. 260—613)

This invention relates to a process for preparing complex aryl polyalkylene ether chlorides and aryloxy alkyl chlorides in which the aryl radical also carries another substituent. It relates further to a process whereby an aryl polyalkylene ether chloride or an aryloxy alkyl chloride is condensed with a compound having an alcoholic hydroxyl group, an olefine double bond or both in its molecule, in the presence of a surface-active siliceous clay as a catalyst. It also relates to certain new compounds which may be produced by this process.

It is known that unsaturated compounds containing olefinic linkages, or alcohols, can be condensed with the aryl polyalkylene halides by means of catalysts of the Friedel-Craft type as is described in the co-pending application of Bruson and Eastes, Serial No. 140,453, filed May 3, 1937. It is also known that compounds of similar type have been prepared by heating the substituted phenol with a dichloro ether in the presence of an alkali as shown by Bruson, U. S. Patents Nos. 2,097,441 and 2,098,203. Similar condensations between alcohols or olefines and aryloxy aliphatic compounds have also been brought about by means of anhydrous zinc chloride or concentrated sulfuric acid.

These processes all have certain disadvantages which it is desirable to overcome. When working with acidic condensing agents, it is necessary to provide acid-proof apparatus and this is particularly true in the case of the Friedel-Craft type of catalyst. Zinc chloride destroys the aryl polyalkylene ether chloride when the temperature is raised to the point at which reaction takes place and sulfuric acid tends to polymerize many olefine compounds and to dehydrate many alcohols, particularly those having a secondary or tertiary hydroxyl group.

It has now been found that condensations of this type can be brought about in a simple and efficient manner by heating the reactants in the presence of certain clays which act as catalysts to cause the elimination of water in case one of the reactants is an alcohol or to cause the aryloxy alkylene chloride to combine with an unsaturated compound containing an olefine linkage. This reaction was entirely unexpected since siliceous clays at high temperatures ordinarily decompose or rearrange ethers and one would, therefore, expect complete break-down of aryloxy alkylene halides.

The clays which are most effective for the purpose of the present invention are primarily aluminum hydrosilicates which may contain combined magnesium, calcium, iron, titanium or other oxides. Many of these have a high absorptive capacity for the coloring matter in mineral oils and are known, therefore, as bleaching clays. Fuller's earth and bentonite belong to this class and are suitable for the purposes of the present invention. Before use they are preferably washed with acid and dried at a temperature not over 150° C. In addition to these, there are many clays marketed under registered trademarks which are also very suitable. These may be purchased on the open market under the names "Tonsil," "Atapulgas," "Floridin," "Terrana" or "Frankonite." These clays are of particular value as catalysts for the herein described reactions when one of the ingredients is a sensitive olefine or alcohol which is often decomposed or polymerized by Friedel-Craft type catalysts.

The aryl polyalkylene ether chlorides and the aryloxy alkyl chlorides which may be used in the process have the general formula $$R'—(O—A)_nCl$$

in which $R'$ is an aryl nucleus such as benzene, naphthalene, phenanthrene, anthracene etc. and which may contain other substituents which are inert in the process such as halogen atoms, hydroxy, alkoxy, aryloxy, hydrocarbon or acyl groups provided, of course, that the nucleus has at least one hydrogen atom available for reaction with the hydroxyl or olefinic compound, A represents an alkylene group containing at least two carbon atoms which may be a straight or branched chain, or a polyalkylene ether radical in which the alkylene groups contain at least two carbon atoms and $n$ is an integer less than 8.

Typical ethers which may be used are those of the following formulas:

$R'—O—CH_2CH_2Cl$
$R'—O—C_4H_8Cl$
$R'—O—(CH_2)_{10}Cl$
$R'—O—CH_2CH_2—O—CH_2CH_2Cl$
$R'—O—CH_2CH_2—O—CH_2CH_2—O—CH_2CH_2Cl$
$R'—(O—CH_2CH_2)_7Cl$
$R'—O—CH_2CH(CH_3)—O—CH(CH_3)CH_2Cl$
$R'—O—C_5H_{10}—O—C_5H_{10}Cl$ and higher homologues. $R'$ may be any aryl group such as phenyl, naphthyl, phenanthryl, anthracyl, etc. and these groups may have other substituents as pointed out above.

These complex ether chlorides will condense with compounds having an alcoholic hydroxyl group or an olefinic double bond when a mixture of such substances is heated to temperatures above 150° C., preferably 180° to 210° C., in the presence of a surface-active siliceous clay, the radical of the olefine or alcohol uniting with the aryl nucleus of the complex ether chloride.

The reaction is applicable to compounds having an alcoholic hydroxyl group or an olefine double bond and which in addition may have other characteristic groups such as carboxylic, aromatic, arylaliphatic or cycloaliphatic groups.

The compounds containing olefinic double bonds which condense readily with the complex aryl ether chlorides may be hydrocarbons, unsaturated acids or their esters, unsaturated acids containing a hydroxyl group or an aromatic nucleus or a hydroaromatic substituent and the esters of such acids. Saturated acids containing a hydroxyl group or the esters of such acids may also be used. Typical of these compounds are the following:

Olefines: butylene, isobutylene, diisobutylene, nonenes, dodecylenes (from the polymerization of propylene), diamylene, laurene, cetene, octylene-2, oleyl chloride, octahydronaphthalene, olefines from cracked petroleum, and other compounds of this nature.

Unsaturated acids: oleic, undecylenic, linolic, linoleic, elaeostearic, ricinoleic and other unsaturated acids derived from drying, semidrying or nondrying oils, and their lower and higher homologues.

Alcohols: aliphatic, arylaliphatic or hydroarylaliphatic branched or straight chain, primary, secondary or tertiary alcohols such as amyl, hexyl, octyl, decyl, undecyl, dodecyl, myristyl, cetyl, oleyl, octadecyl, ceryl, myricyl and mixed aliphatic alcohols obtained from the hydrogenation of fats, or of carbon monoxide, octanol-2, montanic alcohol, benzyl alcohol, phenylethyl alcohol, methyl phenyl carbinol, decahydronaphthol, cholesterol, etc.

Hydroxy acids: 10-hydroxy stearic, ricinoleic, 9,10-dihydroxy stearic, 11-hydroxy undecylic, phenyl hydroxy stearic, cyclohexylhydroxy stearic and the esters of these acids.

The condensation is carried out in general by heating a mixture of the complex ether chloride and the alcohol or unsaturated compound in the presence of the surface-active clay to temperatures above 150° C., preferably 180° to 210° C. at ordinary pressure or in an autoclave, depending on the volatility of the reactants or product. When a compound containing an alcoholic hydroxyl group is one of the reactants, water is evolved and this should preferably be removed from the reaction mixture as fast as it is formed. This can be done by heating the reaction mixture under a reflux condenser equipped with a water trap. The elimination of water may be brought about by carrying out the reaction in the presence of a solvent which does not take part in the reaction and which boils between about 150° and 250° C. The saturated cycloaliphatic hydrocarbons, such as decaline, and saturated petroleum hydrocarbons having the proper boiling range are suitable for the purpose. The amount of clay used is usually 10% to 20% by weight calculated on the combined weight of the reactants. More or less may be used but the above amount gives satisfactory results. After the condensation is complete, the clay is filtered off and the product purified by fractional distillation, preferably under reduced pressure.

The following examples will serve to illustrate the invention which, however, is not limited to the exact reactants, clays, temperature and other conditions of operation shown as it may be otherwise practiced within the scope of the appended claims.

EXAMPLE 1

β-Iso-undecylphenoxy-β'-chlorodiethyl ether

A mixture consisting of 103 g. of 5-ethyl-nonanol-2, 120 g. of β-phenoxy-β'-chlorodiethyl ether and 15 g. of "Tonsil AS" (registered trade-mark) clay was placed in a vessel equipped with an efficient stirrer, a thermometer, and a reflux condenser attached to a water trap. The mixture was stirred vigorously and heated gradually during the period of an hour to 180° C., during which time about 11 cc. of water formed, which distilled over and was collected in the water trap. The temperature was then maintained at 175° to 185° C. for five hours with continuous agitation. The reaction product was filtered while hot, by means of suction, and the clear, almost colorless filtrate fractionally distilled under reduced pressure. The product, boiling above 155° C./0.5-1 mm., was refractionated and yielded 61 g. of an iso-undecylphenoxyethoxy ethyl chloride $$C_{11}H_{23}—C_6H_4—O—CH_2CH_2—O—CH_2CH_2Cl$$

boiling at 190° to 195° C. at about 1 mm., containing 9.7% chlorine (theory 10.0% chlorine) and 40 g. of an isomeric iso-undecylphenoxyethoxy ethyl chloride boiling at 200°–220° C./1 mm.

Other aliphatic alcohols, such as dodecyl, tetradecyl, cetyl, oleyl, or octadecyl alcohol, can be used mol for mol in place of the 5-ethyl-nonanol-2 to yield the corresponding alkyl phenoxyethoxyethyl chlorides.

EXAMPLE 2

β-(Sec. octyl-2-naphthoxy)-β'-chlorodiethyl ether

A mixture consisting of 45 g. of octanol-2, 75 g. of β-(2-naphthoxy)-β'-chlorodiethyl ether, and 12 g. of "Tonsil" clay was stirred and heated under reflux during one and one-half hours to 175° C., and at 175° to 185° C. for three additional hours, during which time 7 cc. of water collected in the water trap attached to the reflux condenser. The filtered reaction product, after fractionation in vacuo, yielded the compound

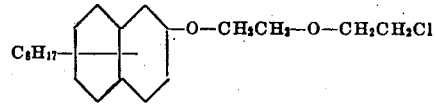

as a pale yellow oil boiling at 210°–220° C./1 mm.

The octanol-2 can be replaced by hexanol-2, heptanol-2, or nonanol-2 to yield the homologous sec. hexyl-, sec. heptyl-, and sec. nonyl-naphthoxyethoxy ethyl chlorides, which are high-boiling yellow oils.

EXAMPLE 3

| | Grams |
|---|---|
| Ethyl-ricinoleate (⅓ mol) (B. P. 200°–205° C./1 mm.) | 108 |
| β-Phenoxy-β'-chlorodiethyl ether (1 mol) | 200 |
| Tonsil clay | 30 |

The above mixture was heated, while stirring for one-half hour, to 180° C., under a reflux condenser attached to a water trap, during which time 6 cc. of water collected in the trap. The temperature was then maintained at 180° C. for four hours, during which time 2 cc. more water came over. The product was filtered hot and the excess β-phenoxy-β'-chlorodiethyl ether recovered by fractionation in vacuo. In this manner, 135 g. of β-phenoxy-β'-chlorodiethyl ether boiling at 113°-120° C./1 mm. was recovered. The residual oil was heated under 1 mm. pressure to 220° C., but no unchanged ethyl recinoleate distilled over. The dark residual oil, weighing 145 g., was bleached by heating at 100° C. for 10 minutes with 10 g. of Tonsil clay and filtered hot. It formed a yellow oil. Analysis showed 7.31% chlorine and an acid number 23, indicating some hydrolysis of the ester had occurred. The product is largely a β-chloroethoxyethyl ether of hydroxy phenyl fatty acid ethyl ester, having 18 carbon atoms in the fatty acid chain.

This ester may be saponified with alkali and the free acid obtained by acidifying the solution of the alkali metal salt. From this acid other esters and salts of organic or inorganic bases can be prepared in any conventional manner.

Example 4

A mixture consisting of 91 g. of oleic acid, 134 g. of β-phenoxy-β'-chlorodiethyl ether, and 23 g. of Tonsil clay was heated with stirring for four hours at 185° to 200° C. under a reflux condenser. The filtered product was then distilled in high vacuo to remove all unchanged materials until the vapor temperature reached 200° C./0.5 mm. The residue was a reddish oil weighing 110 g. and contained 6.5% chlorine.

The resulting chloroethoxyethoxy phenyl stearic acid may be converted to esters or salts of organic or inorganic bases as desired.

Example 5

A mixture consisting of 61 g. of methylphenyl carbinol, 150 g. of β-phenoxy-β'-chlorodiethyl ether, and 20 g. of Tonsil clay was stirred and heated for four hours at 180° to 190° C. under reflux attached to a water trap. The filtered product was fractionally distilled in vacuo. The compound

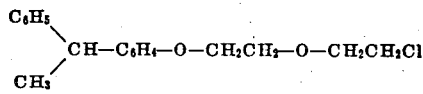

distilled over at 190°-205° C./2 mm. as a pale yellow oil with a blue fluorescence.

Example 6

A mixture consisting of 100 g. of β-phenoxy-β'-chlorodiethyl ether, 54 g. of benzyl alcohol and 7.7 g. of Tonsil clay was stirred and heated for three hours at 170° to 180° C. under reflux attached to a water trap. The product was filtered and the filtrate fractionated in vacuo.

Benzylphenoxyethoxyethyl chloride came over at 200°-220° C./3 mm.

Example 7

A mixture, consisting of 80 g. of β-phenoxy-β'-chlorodiethyl ether, 10 g. of Tonsil clay, and 49 g. of higher alcohols from the methanol synthesis, boiling at 190° to 210° C. and consisting of mixed primary and secondary branched chain monohydric alcohols, containing from about 9 to 12 carbon atoms resulting from the catalytic reduction of carbon monoxide with hydrogen, was heated for four hours, with stirring under reflux attached to a water trap. The filtered product, upon fractionation in vacuo, yielded the mixed C9—C12 alkylphenoxyethoxyethyl chlorides as a pale yellow oil boiling at 180°-220° C./2 mm.

Example 8

A mixture consisting of 180 g. of β-phenoxy-β'-chlorodiethyl ether, 117 g. of octanol-2, and 20 g. of Tonsil clay was heated with stirring for four hours at 160°-175° C. under reflux attached to a water trap. The sec. octyl-phenoxy-ethoxy-ethyl chloride was obtained in 60% yield as a pale yellow oil, B. P. 175°-185° C./3 mm.

Example 9

A mixture, consisting of 109 g. of ethyl-10 hydroxy stearate, 122 g. of β-phenoxy-β'-chlorodiethyl ether and 23 g. of Tonsil clay, was stirred and heated for four hours at 180° to 185° C. under a reflux condenser attached to a water trap. The product was filtered and the filtrate distilled in vacuo at 1-2 mm. until the vapor temperature reached 210° C. The still residue, weighing 127 g., was clarified with bleaching clay. It contained 6% chlorine by analysis. Theoretical chlorine is 6.95% for

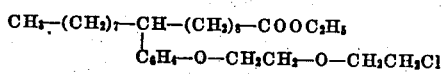

This ester may be saponified with alkali and the free acid obtained by acidifying the solution of the alkali metal salt. From this acid other esters and salts of organic or inorganic bases can be prepared in any conventional manner.

Example 10

A mixture consisting of 95 g. of methyl undecylenate, 150 g. of β-phenoxy-β'-chlorodiethyl ether and 25 g. of Tonsil clay was stirred and heated under reflux attached to a water trap, for five hours at 170° to 190° C. The filtered product was distilled under reduced pressure. There was obtained 60 g. of pale yellow oil boiling at 200°-220° C./1 mm., containing 9.38% of chlorine and having the probable formula

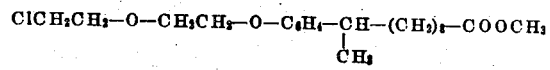

This ester may be saponified with alkali and the free acid obtained by acidifying the solution of the alkali metal salt. From this acid other esters and salts of organic or inorganic bases can be prepared in any conventional manner.

Example 11

A mixture, consisting of 56 g. of β-phenoxyethyl chloride, 66.5 g. of dodecyl alcohol, and 15 g. of acid-washed Tonsil bleaching earth, was refluxed three and one-quarter hours at 167° to 195° C., during which time 2.5 cc. of water was removed in a separator and the remaining distillate returned to the reaction mixture. Heating was continued for an additional sixteen hours at 195° to 181° C. The reaction mixture was diluted with toluene, filtered from the clay, and distilled in vacuo. The β-chloro ethyl ether of dodecyl phenol was obtained as a pale yellow oil, 97.5% pure, B. P. 180°-200° C./1 mm.

Example 12

A mixture consisting of 112 g. of n-butyl oleate (B. P. 178°-188° C./1 mm.), 100 g. of β-phenoxy-β'-chlorodiethyl ether and 20 g. of Tonsil clay was heated under reflux, with rapid stirring, for about six hours at 186° to 195° C. The filtered oil was then distilled in vacuo until the vapor temperature reached 210° C. at 1 mm. pressure. The residue, weighing 125 g., was a dark oil containing 5.5% chlorine and having an acid number 88.4, indicating substantial addition of the phenyl nucleus to the double bond had occurred, together with some hydrolysis of the ester group.

This ester may be saponified with alkali and the free acid obtained by acidifying the solution of the alkali metal salt. From this acid other esters and salts of organic or inorganic bases can be prepared in any conventional manner.

EXAMPLE 13

A mixture, consisting of 76 g. of decahydro-$\beta$-naphthol, 100 g. of $\beta$-phenoxy-$\beta'$-chlorodiethyl ether, and 18 g. of Tonsil clay, was stirred and heated under reflux attached to a water trap, for four and one-half hours at 180° to 200° C. The filtered product was distilled in vacuo to yield decahydronaphthylphenoxyethoxyethyl chloride as a greenish fluorescent oil boiling at 210°–220° C./2 mm.

The compounds prepared according to Examples 3, 4, 9, 10 and 12 are all derivatives of substituted fatty acids in which the substitent is a chloralkoxy aryl group or a chloropolyalkoxy aryl group. The esters, the corresponding acids and salts may be expressed by the general formula Cl—(O—A)$_n$—R'—Y—COOM in which A, $n$ and R' have the meanings given above, Y is an aliphatic hydrocarbon chain which may also have a double bond or an aromatic or hydroaromatic substituent, and M is hydrogen, a hydrocarbon radical or a basic organic or inorganic salt-forming group or a metal.

All of the complex aryloxy alkyl or aryl polyalkylene ether chlorides described herein are useful intermediates for preparing water-soluble capillary-active compounds. For example, the aromatic ring may be sulfonated to yield water-soluble sulfonic acids which along with their water-soluble salts of organic or inorganic bases are good wetting, cleansing, dispersing and emulsifying agents. The terminal chlorine atom may be replaced by an —SO$_3$Na group as is described in my co-pending application Serial No. 187,158 filed January 27, 1938 by heating the complex ether chloride with aqueous sodium sulfite. The free sulfonic acid can be prepared from the sodium salt and can be converted into other salts of organic or inorganic bases.

The complex aryl ether halides also react with ammonia, primary, secondary or tertiary amines which may contain sulfonic or carboxylic acid groups whereby the R—R'—(O—A)$_n$— group is attached to the nitrogen atom and forms amines or quaternary ammonium salts.

Thio ethers may be prepared by heating the complex ether with sodium sulfide and the mercaptans by heating with sodium hydrosulfide. Caustic soda at high temperatures will replace the chlorine atom with a hydroxyl group. By heating the complex ether chlorides with an alcohol X—OH and an alkali, the chlorine atom is removed and the ether R—R'—(O—A)$_n$—OX is formed.

All of the derivatives and further reaction products of the complex ether chlorides are also very useful for preparing capillary-active substances which are good wetting, dispersing, cleansing, and emulsifying agents.

In the foregoing description the complex ether chlorides have been used as illustrations. It is, of course, possible to carry out the same reactions with the corresponding bromides and iodides.

I claim:

1. The process of preparing compounds of the general formula R—R'—(O—A)$_n$Cl in which R is a member of the group consisting of aliphatic, arylaliphatic and hydroarylaliphatic radicals, R' is an aryl nucleus, A is selected from the group consisting of alkylene radicals containing at least two carbon atoms and polyalkylene ether radicals containing at least two carbon atoms in each alkylene group and $n$ is an integer less than 8, which comprises heating in the presence of a surface-active siliceous clay an ether chloride R'—(O—A)$_n$Cl and a member of the group consisting of aliphatic, arylaliphatic, and hydroarylaliphatic alcohols and olefinic hydrocarbons.

2. The process of preparing compounds of the general formula R—R'—(O—A)$_n$Cl in which R is an aliphatic radical, R' is an aryl nucleus, A is selected from the group consisting of alkylene radicals containing at least two carbon atoms and polyalkylene ether radicals containing at least two carbon atoms in each alkylene group and $n$ is an integer less than 8, which comprises heating in the presence of a surface-active siliceous clay an ether chloride R'—(O—A)$_n$Cl and an aliphatic alcohol.

3. The process of preparing compounds of the general formula R—R'—(O—A)$_n$Cl in which R is an aliphatic radical, R' is an aryl nucleus, A is selected from the group consisting of alkylene radicals containing at least two carbon atoms and polyalkylene ether radicals containing at least two carbon atoms in each alkylene group and $n$ is an integer less than 8, which comprises heating in the presence of a surface-active siliceous clay an ether chloride R'—(O—A)$_n$Cl and an olefine.

4. The process of preparing compounds of the general formula R—C$_6$H$_4$—(O—A)$_n$Cl in which R is an aliphatic radical, A is a member of the group consisting of alkylene radicals containing at least two carbon atoms and polyalkylene ether radicals containing at least two carbon atoms in each alkylene group and $n$ is an integer less than 8, which comprises heating in the presence of a surface-active clay an ether chloride C$_6$H$_5$(O—A)$_n$Cl and an aliphatic alcohol.

5. The process of preparing compounds of the general formula R—C$_6$H$_4$—(O—A)$_n$Cl in which R is an aliphatic radical, A is a member of the group consisting of alkylene radicals containing at least two carbon atoms and polyalkylene ether radicals containing at least two carbon atoms in each alkylene group and $n$ is an integer less than 8, which comprises heating in the presence of a surface-active clay an ether chloride C$_6$H$_5$—(O—A)$_n$Cl and an olefine.

6. The process of preparing compounds of the general formula RC$_6$H$_4$OCH$_2$.CH$_2$OCH$_2$CH$_2$Cl in which R is a member of the group consisting of aliphatic, arylaliphatic, and hydroarylaliphatic radicals, which comprises heating in the presence of a surface-active clay the compound C$_6$H$_5$OCH$_2$CH$_2$OCH$_2$CH$_2$Cl and a member of the group consisting of aliphatic, arylaliphatic, and hydroarylaliphatic alcohols and olefinic hydrocarbons.

7. The process of preparing a compound of the formula RC$_6$H$_4$OCH$_2$CH$_2$OCH$_2$CH$_2$Cl in which R is an aliphatic group which comprises heating in the presence of a surface-active clay the compound C$_6$H$_5$OCH$_2$CH$_2$OCH$_2$CH$_2$Cl and an aliphatic alcohol.

8. The process of preparing a compound of the formula $RC_6H_4OCH_2CH_2OCH_2CH_2Cl$ in which R is an aliphatic group which comprises heating in the presence of a surface-active clay the compound $C_6H_5OCH_2CH_2OCH_2CH_2Cl$ and an olefine.

9. The process of preparing $$C_{12}H_{25}.C_6H_4OCH_2CH_2OCH_2CH_2Cl$$

which comprises heating in the presence of a surface-active clay between about 150° C. and about 210° C. $C_6H_5OCH_2CH_2OCH_2CH_2Cl$ and dodecyl alcohol.

10. The process of preparing $$RC_6H_4OCH_2CH_2OCH_2CH_2Cl$$

wherein R represents a branched chain aliphatic hydrocarbon group of approximately 9 to 12 carbon atoms which comprises heating in the presence of a surface-active clay between about 150° C. and about 210° C. a mixture of β-chloroethoxy-ethoxy benzene and higher alcohols obtainable from the methanol synthesis and boiling at 190° C. to 210° C.

HERMAN A. BRUSON.